United States Patent
Wright et al.

(10) Patent No.: US 8,330,790 B2
(45) Date of Patent: Dec. 11, 2012

(54) SYSTEM AND METHOD OF AUTOMATING ACCESS TO A VIDEOCONFERENCING ROOM

(75) Inventors: Lloyd E. Wright, Albany, OR (US); Stephen F. Froelich, Corvallis, OR (US)

(73) Assignee: Hewlett-Packard Company, L.P., Houston, TX (US)

( * ) Notice: Subject to any disclaimer, the term of this patent is extended or adjusted under 35 U.S.C. 154(b) by 1505 days.

(21) Appl. No.: 11/846,172

(22) Filed: Aug. 28, 2007

(65) Prior Publication Data
US 2009/0058985 A1      Mar. 5, 2009

(51) Int. Cl.
*H04N 7/14* (2006.01)
(52) U.S. Cl. .................. 348/14.05; 348/14.01
(58) Field of Classification Search .... 348/14.01–14.09; 709/204
See application file for complete search history.

(56) References Cited

U.S. PATENT DOCUMENTS

| | | |
|---|---|---|
| 5,867,494 A | 2/1999 | Krishnaswamy et al. |
| 6,195,117 B1 | 2/2001 | Miyazaki |
| 6,466,252 B1 | 10/2002 | Miyazaki |
| 6,614,450 B1 * | 9/2003 | Vossler .......................... 715/751 |
| 2001/0013891 A1 | 8/2001 | Hamilton |
| 2004/0006697 A1 * | 1/2004 | Noyama et al. ............... 713/182 |
| 2007/0162315 A1 * | 7/2007 | Hodges ............................ 705/8 |
| 2007/0176739 A1 * | 8/2007 | Raheman ..................... 340/5.64 |

FOREIGN PATENT DOCUMENTS

| | | |
|---|---|---|
| JP | 10112850 | 4/1998 |
| JP | 200174934 | 6/2000 |

* cited by examiner

*Primary Examiner* — Curtis Kuntz
*Assistant Examiner* — Sunita Joshi

(57) ABSTRACT

A videoconferencing system and method of automating access to a videoconferencing room is provided. The videoconferencing system includes a reservation controller for comparing remote identifying information and local identifying information and for receiving a deposit. A payment collector is in communication with the reservation controller for receiving the deposit from the reservation controller. An access controller is in communication with the payment collector and the reservation controller for allowing access to the videoconferencing room if the remote identifying information matches the local identifying information. The method includes the steps of receiving remote identifying information, receiving local identifying information, comparing the local identifying information to the remote identifying information, and electronically unlocking a door of the videoconferencing room if the local identifying information matches the remote identifying information.

20 Claims, 3 Drawing Sheets

SYSTEM AND METHOD OF AUTOMATING ACCESS TO A VIDEOCONFERENCING ROOM

BACKGROUND

Various types of videoconferencing rooms are known in the art. As videoconferencing technology becomes more sophisticated, it is often more cost-effective to reserve a public videoconferencing room than to build a private, state-of-the-art videoconferencing room. Therefore, publicly available videoconferencing rooms having sophisticated technology are becoming popular among businesses and individuals that require the occasional use of a videoconferencing room, but do not want to furnish a private videoconferencing room with sophisticated technology.

In general, public videoconferencing rooms require a room attendant to make reservations and allow those with reservations (i.e., patrons) access to the videoconferencing room. The room attendant schedules the patron to use the videoconferencing room at a room access time, grants the patron access the videoconferencing room at the room access time, collects deposits and payments from the patron, and enables the electronic equipment in the videoconferencing room. In other words, the functionality of public videoconferencing rooms is essentially disabled without an attendant and access is limited to hours of operation when a room attendant is present. Accordingly, the embodiments described hereinafter were developed in light of these and other drawbacks associated with known systems and methods for accessing videoconferencing rooms.

DETAILED DESCRIPTION

A videoconferencing system is provided that allows a patron to reserve a videoconferencing room remotely, access the videoconferencing room at a room access time, and enable electronic equipment disposed within the room at the room access time. The videoconferencing system includes a reservation controller, a payment collector in communication with the reservation controller, and an access controller in communication with both the reservation controller and the payment collector. The patron provides remote identifying information to the reservation controller, and when the patron arrives at the videoconferencing room at the room access time, the patron provides local identifying information to the access controller. The remote identifying information is compared to the local identifying information, and if the remote identifying information matches the local identifying information, the electronically controlled door of the videoconferencing room is unlocked and the patron is granted access to the videoconferencing room.

Figure 1:
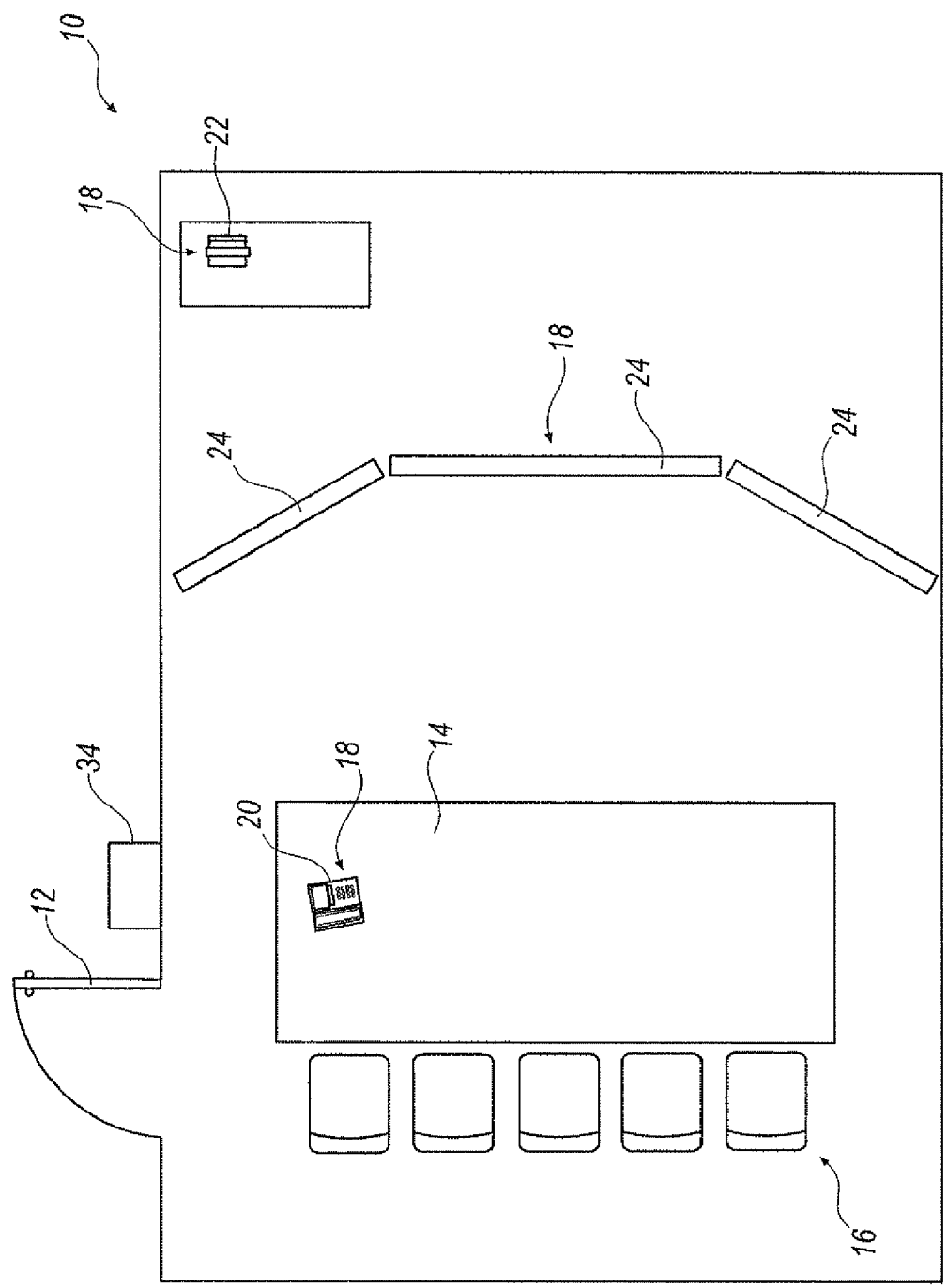
FIG. 1 is an overhead view of a videoconferencing room in accordance with an embodiment.

FIG. 1 illustrates an exemplary embodiment of a videoconferencing room 10 having an electronically controlled door 12, a table 14, chairs 16, and electronic equipment 18. The electronic equipment 18 may include, but is not limited to, a telephone 20, a computer 22 or server (hereinafter, "computer"), and one or more display monitors 24. It is to be understood that the electronic equipment 18 may include any number of telephones 22, computers 24, or display monitors 24 arranged in any configuration within the videoconferencing room 10. For example, some or all of the electronic equipment 18 may be hidden from view or unavailable for patrons to access while using the videoconferencing room 10. As shown in FIG. 1, the computer 22 is disposed behind the display monitors 24, while the telephone 20 is on the table 14 and accessible to the patrons. The telephone 20 may instead be mounted to a wall of the videoconferencing room 10. Alternatively, some or all of the electronic equipment 18 may be disposed outside the videoconferencing room 10 or in another room. Although not shown, the videoconferencing room 10 may also include other electronic equipment 18, including, but not limited to, cameras, speakers, microphones, a keyboard, a mouse, a remote control, a voice recognition device, an amplifier, other audio/video transmitting, receiving, or processing equipment.

Figure 2:
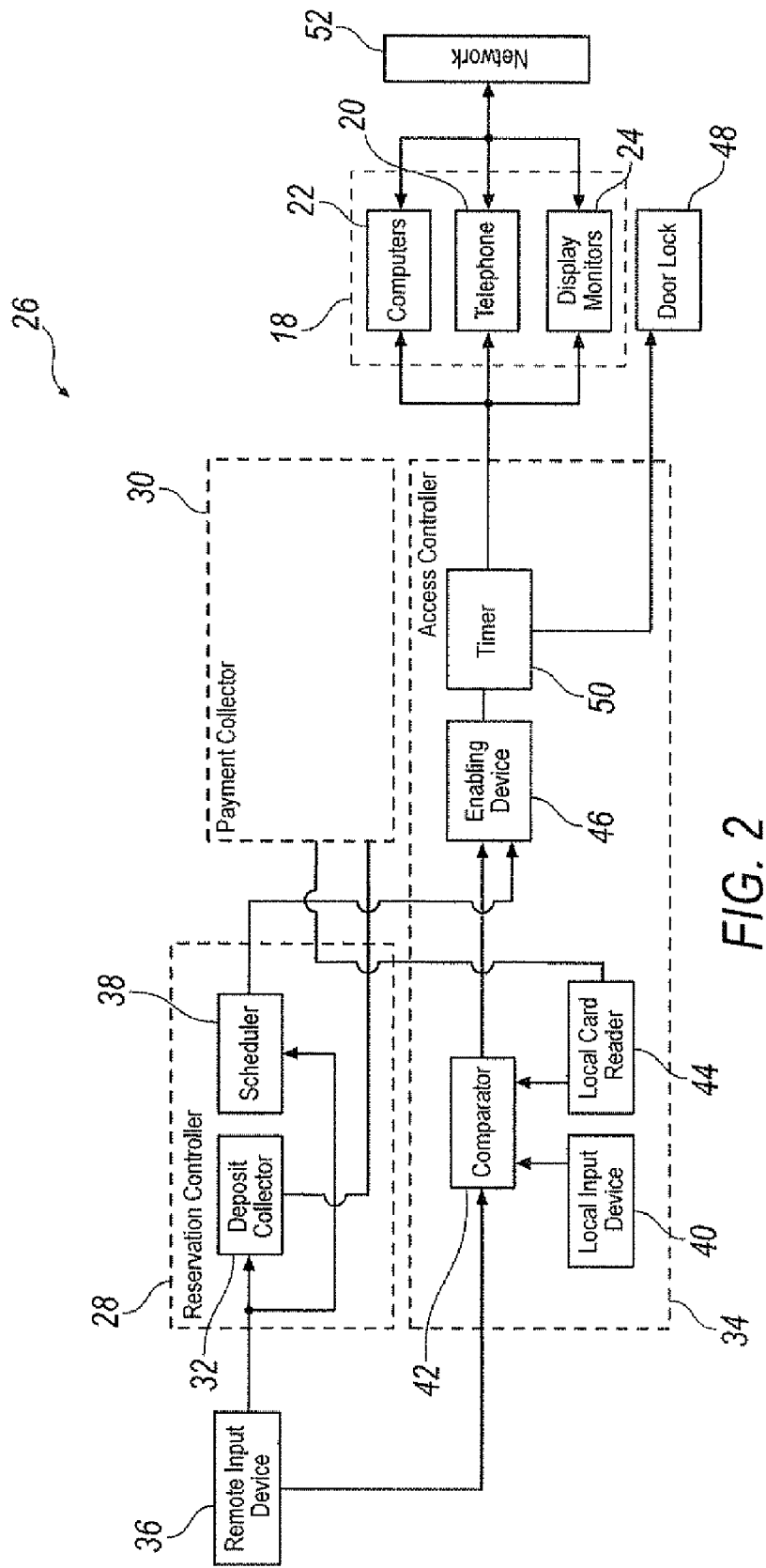
FIG. 2 is a schematic diagram of a system for automating access to the videoconferencing room in accordance with an embodiment.

Referring now to FIG. 2, an exemplary videoconferencing system 26 used with the videoconferencing room 10 is shown. The videoconferencing system 26 includes a reservation controller 28 that may be used by the patron to reserve the videoconferencing room 10. The reservation controller 28 is configured to receive identifying information from the patron such as, but not limited to, the patron's name, account number, credit card number, date of birth, biometric information, information stored on a unique token (i.e., a smart card), a secret word or phrase, or any other identifying feature or combination of identifying features. The reservation controller 28 may further be used to receive a deposit from the patron. The reservation controller 28 may be accessed by the patron through any suitable means, including but not limited to, web access via the Internet, telephone, or directly through a user interface at the videoconferencing room 10 location. For purposes of explanation, this identifying information that is received by the reservation controller 28 is referred to hereinafter as "remote" identifying information, regardless as to the physical location from which the reservation controller 28 is accessed, or the method by which communication with the reservation controller 28 is established.

The videoconferencing system 26 may include a payment collector 30 in communication with the reservation controller 28 for receiving the deposit from the reservation controller 28. Specifically, the reservation controller 28 may include a deposit collector 32 in communication with the payment collector 30. The deposit collector 32 routes payment information to the payment collector 30, and the payment collector 30 accepts the deposit and may credit the patron's account with the deposit. The payment collector 30 may or may not be physically located at the videoconferencing room 10 location.

In addition, the videoconferencing system 26 includes an access controller 34 in communication with reservation controller 28 and the payment collector 30. Specifically, the access controller 34 receives the remote identifying information from the reservation controller 28. As shown in FIG. 1, the access controller 34 in one embodiment is disposed outside the videoconferencing room 10 to receive local identifying information from the patron and allow the patron access to the videoconferencing room 10 if the remote identifying information matches the local identifying information. Like the remote identifying information, the local identifying information may include, but is not limited to, the patron's name, account number, credit card number, date of birth, biometric information, information stored on a unique toke (i.e., a smart card), a secret word or phrase, or any other identifying feature or combination of identifying features. The patron provides the local identifying information to the access controller 34. Once both the remote identifying information and the local identifying information are known, the access controller 34 may determine whether to grant the patron access to the videoconferencing room 10 based upon predetermined entrance criteria.

The videoconferencing system 26 may further include a remote input device 36 in communication with the reservation controller 28. The remote input device 36 may be located at a remote location relative to the videoconferencing room 10 and configured to receive the remote identifying information from the patron and transmit the remote identifying information to the reservation controller 28. In addition, the remote input device 36 is in communication with the deposit collector 32 for receiving the deposit from the patron and transmitting the deposit to the deposit collector 32. The remote input device 36 may be any device known in the art for receiving the remote identifying information and the deposit. For instance, the remote input device 36 may include a computer having a keyboard or a telephone to allow the patron to make a reservation for the videoconferencing room 10 via the Internet or by telephone. Also, the keyboard may allow the patron to input the remote identifying information. Therefore, the remote input device 36 may connect to the reservation controller 28 through any network, such as the Internet or a telephone network. In addition, the remote input device 36 may include a remote card reader for receiving the deposit via a credit card or a subscription card. Furthermore, the remote input device 36 may be configured to receive biometric information or read unique tokens (i.e., smart cards).

The reservation controller 28 may further include a scheduler 38 in communication with the remote input device 36 for receiving a room access time from the remote input device 36. The scheduler 38 is in communication with the access controller 34 for allowing the access controller 34 to determine whether to grant the patron access to the videoconferencing room 10.

In one embodiment, the access controller 34 includes a local input device 40, a comparator 42 and an enabling device 46. The comparator 42 is configured to receive the local identifying information from the patron. Specifically, the patron may input the local identifying information into the local input device 40. The local input device 40 may be any input device known in the art. For instance, the local input device 40 may be a keyboard or a voice recognition device. After receiving both the remote identifying information and the local identifying information, the videoconferencing system 26 can determine whether the patron present at the videoconferencing room 10 should be granted access to the videoconferencing room 10. In one embodiment, the videoconferencing system 26 would grant access to only the patron who made the reservation. In another embodiment, the videoconferencing system 26 may grant access to a patron other than the patron who reserved the videoconferencing room 10. For instance, the videoconferencing system 26 may grant access to the patron's clients or associates. Also, this embodiment would allow for the patron's assistant to make the reservation for the patron and the patron's clients and associates.

The comparator 42 is in communication with the remote input device 36 and the local input device 40 and is configured to compare the remote identifying information to the local identifying information. If the remote identifying information matches the local identifying information, the door 12 of the videoconferencing room 10 is unlocked to grant the patron access to the videoconferencing room 10. The access controller 34 may further include a local card reader 44 in communication with the comparator 42 for receiving a credit card, subscription card, or any other card having local identifying information or authorizing a payment. The comparator 42 may receive the local identifying information from the local card reader 44, or receive a payment from the patron and transmit the payment to the payment collector 30. Alternatively, the local input device 40 or the card reader 44 may be configured to receive biometric data or unique tokens (i.e., smart cards).

The enabling device 46 is in communication with the reservation controller 28, and specifically, the scheduler 38 and the comparator 42. The enabling device 46 enables the electronic equipment 18 disposed within the room at the room access time. A door lock 48, such as an actuator, is in communication with the enabling device 46 and actuates the door lock 48 to allow access into the videoconferencing room 10 via the electronically controlled door 12. In addition, the enabling device 46 is in communication with the electronic equipment 18 including, but not limited to, the computer 22, display monitors 24, and telephone 20.

The access controller 34 may further include a timer 50 in communication with the enabling device 46 and the computer 22, telephone 20, display monitor 24, or other electronic equipment 18 for disabling the computer 22, telephone 20, display monitors 24, or other electronic equipment 18 after the room access time has lapsed. In addition to the timer 50 disabling the electronic equipment 18 in the videoconferencing room 10, to ensure that the videoconferencing room 10 is not occupied beyond the room access time, the videoconferencing room 10 may include motion detectors or another device capable of detecting a presence in the videoconferencing room 10. In one embodiment, the videoconferencing room 10 may further include an alarm that produces a loud sound to encourage those in the videoconferencing room 10 beyond the room access time to leave. The alarm may be activated in response to the room access time lapsing or in response to the motion detectors detecting a presence in the videoconferencing room 10 beyond the room access time. In another embodiment, the motion detectors may notify a room attendant outside the videoconferencing room 10 that a patron is still present in the videoconferencing room 10 beyond the room access time. In yet another embodiment, the room attendant may simply view images received from cameras disposed in the videoconferencing room 10 to determine whether patrons are in the videoconferencing room 10 beyond the room access time.

The electronic equipment 18 (i.e., the telephone 20, the computer 22, and the display monitors 24, among others) are in communication with a network 52 via a wired, wireless, fiber optic, or any other suitable connection. The network 52 allows each piece of the electronic equipment 18 to communicate with other devices disposed outside the videoconferencing room 10. For instance, the network 52 allows the display monitor 24 to receive video images of other videoconferencing rooms. In addition, the telephone 20 may use the network 52 to communicate with other telephones outside the videoconferencing room. Furthermore, the computer 22 may act as a server once connected to the network 52.

In one embodiment, the remote input device 36 and the local input device 40 are combined within the access controller 34, or other user interface (not shown), such that both the remote identifying information and the local identifying information are collected using the same device. This would allow a patron to reserve the videoconferencing room 10 at the videoconferencing room 10 location without having to use a telephone or the Internet.

In yet another embodiment, the local input device 40, access controller 34, or other user interface can be used to grant access to the videoconferencing room 10 on an ad hoc basis. In this way, the local input device 40 or access controller 34 communicates directly with the deposit collector 32 and the scheduler 38 to both designate a room access time or duration (i.e., for one hour beginning now) and to pay the deposit and/or payment immediately, provided that the scheduler 38 does not indicate that the videoconferencing room 10 is already reserved. In other words, the patron will be granted immediate access to the videoconferencing room 10 as long as there are no conflicts determined by the scheduler 38.

Figure 3:
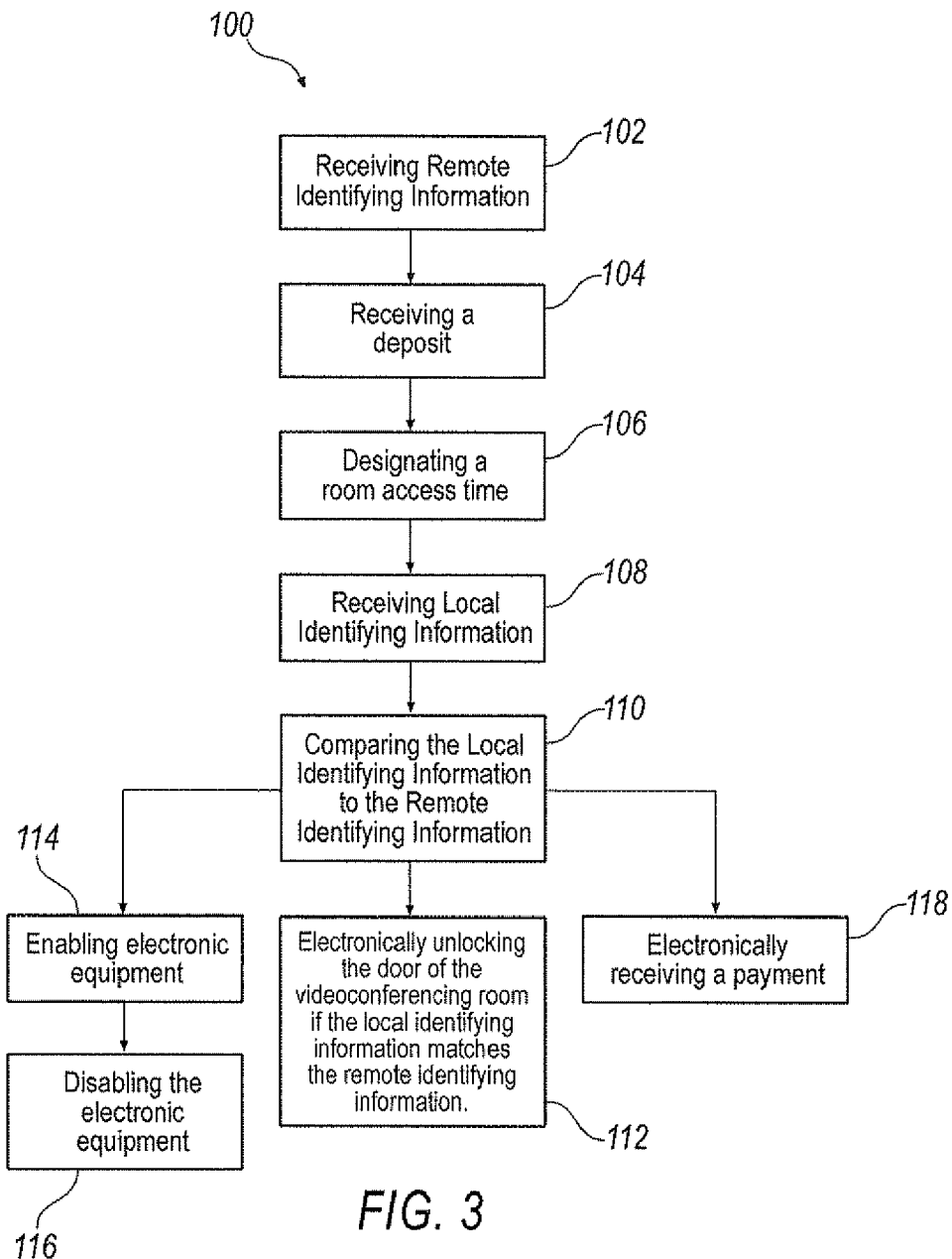
FIG. 3 is a flowchart of a method of automating access to the videoconferencing room according to an embodiment.

Referring now to FIG. 3, an exemplary method 100 of automating access to the videoconferencing room 10 is provided. It is to be understood that the steps of the method 100 may be performed in an order other than shown or described herein. Also, some of the steps may be performed simultaneously with one or more other steps of the method 100. The method 100 includes a step 102 of receiving the remote identifying information. As discussed above, the remote identifying information may be received at the time the videoconferencing room 10 is reserved. Next, the method 100 may include a step 104 of electronically receiving a deposit that may be received at the time the videoconferencing room 10 is reserved. The method 100 may further include a step 106 of designating a room access time, which may include receiving a proposed room access time and comparing the proposed room access time to previously received room access times. If the videoconferencing room 10 is available during the proposed room access time, then the proposed room access time becomes the room access time. Otherwise, the patron may be given an opportunity to provide a different proposed room access time. The proposed room access time may be received at the remote input device 36 at the time the reservation for the videoconferencing room 10 is made. Next, the method 100 includes a step 108 of receiving local identifying information. As described above, the local identifying information is generally received at the room access time. At step 110 the local identifying information is compared to the remote identifying information. The method 100 then includes a step 112 of electronically unlocking the door 12 of the videoconferencing room 10 if the local identifying information matches the remote identifying information. In one embodiment, the step 112 of electronically unlocking the door may include actuating the door lock 52.

In addition to comparing the local identifying information previously discussed, the step 110 of comparing the local identifying information to the remote identifying information may include determining the local time and comparing the local time to the room access time. The videoconferencing system 26 may allow for the patron to access the videoconferencing room 10 only at the room access time or the videoconferencing system 26 may allow for the patron to access the videoconferencing room 10 earlier than the room access time. Therefore, in this embodiment, the step 112 of electronically unlocking the door 12 may be further defined as electronically unlocking the door 12 if the local time is within a predetermined range of time relative to the room access time. The predetermined range of time may be any amount of time. For instance, the predetermined range of time may be set to fifteen minutes to allow the patron to enter the videoconferencing room 10 early to prepare for the videoconference. Alternatively, the predetermined range of time may be set to 0 minutes to ensure that the patron may only access the room during the room access time.

In addition to step 112 of electronically unlocking the door 12, the method 100 may further include steps 114 and 116, respectively, of enabling and disabling the electronic equipment 18. It is to be understood that the step 114 of enabling the electronic equipment 18 and the step 116 of disabling the electronic equipment may include enabling and disabling at least one of the telephone 20, the computer 22, and the display monitor 26. Finally, the method 100 may include a step 118 of electronically receiving a payment. It is to be understood that the payment may be received at the room access time, or the payment may be received at any time before or after the room access time.

In another embodiment, the method 100 may only receive identifying information at the local input device 40. In other words, the patron would not need to provide the remote identifying information. In this embodiment, the method 100 may include the step 108 of receiving local identifying information from the patron via the local input device 40, and the step 106 of designating a room access time, which, as in the previous embodiment, may include receiving a proposed room access time and comparing the proposed room access time to previously received room access times. If the videoconferencing room 10 is available during the proposed room access time, then the proposed room access time becomes the room access time. Then, the method 100 may include automatically granting access to the videoconferencing room based on the room access time and the identifying information. This embodiment of method 100 may be used if the patron arrives at the videoconferencing room 10 without a reservation or without having previously provided remote identifying information but would still like to use the videoconferencing room.

It is to be understood that the above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A method of automating access to a videoconferencing room, said method comprising the steps of:
   receiving remote identifying information for reservation of said videoconferencing room at a specified room access time;
   receiving local identifying information;
   comparing the local identifying information to the remote identifying information; and
   electronically unlocking a door of the videoconferencing room if the local identifying information matches the remote identifying information;
   wherein electronically unlocking the door comprises electronically unlocking the door if a local time is within a predetermined range of time relative to the room access time so that a user may access the videoconferencing room for preparation prior to the room access time.

2. A method as set forth in claim 1 further comprising electronically receiving at least one of a deposit and a payment.

3. A method as set forth in claim 1 further comprising designating the room access time.

4. A method as set forth in claim 3 wherein designating the room access time comprises:
   receiving a proposed room access time; and
   comparing the proposed room access time to previously reserved room access times.

5. A method as set forth in claim 1 further comprising receiving payment for use of said videoconferencing room with a card reader that is also used for receiving said local identifying information at the videoconferencing room.

6. A method as set forth in claim 1 further comprising using a camera in the videoconferencing room to remotely verify that the room has been vacated after expiration of a time period associated with said reservation 5.

7. A videoconferencing system comprising:
   a reservation controller;
   an access controller in communication with said reservation controller, said access controller being configured to allow access to a videoconferencing room by unlocking an electronic door lock of said videoconferencing room and enabling equipment within said videoconferencing room if remote identifying information received by the reservation controller when a reservation for the videoconferencing room was made matches local identifying information input at the videoconferencing room to gain access thereto;
   a timer for timing use of said videoconferencing room, wherein said access controller disables said equipment within said videoconferencing room upon said timer indicating that a time for using said videoconferencing room associated with said reservation has elapsed.

8. A system as set forth in claim 7 further comprising a remote input device in communication with said reservation controller, said remote input device being configured to receive the remote identifying information and a deposit.

9. A system as set forth in claim 8 wherein said access controller includes a local input device for receiving the local identifying information.

10. A system as set forth in claim 9 wherein said access controller includes a comparator in communication with said remote input device and said local input device, said comparator being configured to compare the remote identifying information to the local identifying information.

11. A system as set forth in claim 10 wherein said access controller includes a local card reader in communication with said comparator.

12. A system as set forth in claim 8 wherein said reservation controller includes a deposit collector in communication with said remote input device, said deposit collector being configured to receive the deposit from said remote input device.

13. A system as set forth in claim 12 further comprising a payment collector in communication with said reservation controller.

14. A system as set forth in claim 8 wherein said reservation controller includes a scheduler in communication with said remote input device, said scheduler being configure to receive a room access time from said remote input device.

15. A system as set forth in claim 7 wherein said access controller includes an audible alarm for sounding an audible alarm within said videoconferencing room after said timer has indicated that the time for using said videoconferencing room associated with said reservation has elapsed and after said access controller disables said equipment within said videoconferencing room to encourage a user in said videoconferencing room after the time associated said reservation has elapsed to leave said video conferencing room.

16. A system as set forth in claim 7 further comprising motion detectors within said videoconferencing room for detecting an unauthorized presence in said videoconferencing room after the time associated said reservation has elapsed.

17. A method of reserving a videoconferencing room comprising:
    receiving identifying information associated with a subscription to use said videoconferencing room;
    designating a room access time; and
    automatically granting access to the videoconferencing room based on the room access time and presentation of a subscription card associated with said subscription.

18. A method as set forth in claim 17 wherein designating the room access time comprises:
    receiving a proposed room access time; and
    comparing the proposed room access time to previously reserved room access times.

19. A method as set forth in claim 18 further comprising:
    determining a local time; and
    comparing the local time to the room access time.

20. A method as set forth in claim 17 wherein automatically granting access is further defined as electronically unlocking a door of the videoconferencing room.

* * * * *

UNITED STATES PATENT AND TRADEMARK OFFICE
CERTIFICATE OF CORRECTION

PATENT NO. : 8,330,790 B2
APPLICATION NO. : 11/846172
DATED : December 11, 2012
INVENTOR(S) : Lloyd E. Wright et al.

It is certified that error appears in the above-identified patent and that said Letters Patent is hereby corrected as shown below:

In the Claims:

In column 7, line 20, in Claim 6, delete "reservation 5." and insert -- reservation. --, therefor.

Signed and Sealed this
Twenty-eighth Day of May, 2013

Teresa Stanek Rea
*Acting Director of the United States Patent and Trademark Office*